July 30, 1940.　　S. C. WATSON　　2,209,367
SHAFT COUPLING
Filed Feb. 9, 1939　　2 Sheets-Sheet 1

Inventor
Sydney C. Watson
by Parker + Carter
Attorneys.

July 30, 1940.    S. C. WATSON    2,209,367
SHAFT COUPLING
Filed Feb. 9, 1939    2 Sheets-Sheet 2

Inventor
Sydney C. Watson
by Parker + Carter
Attorneys.

Patented July 30, 1940

2,209,367

UNITED STATES PATENT OFFICE 2,209,367

SHAFT COUPLING

Sydney C. Watson, Chicago, Ill., assignor, by direct and mesne assignments, to Tor-Vel Associates Application February 9, 1939, Serial No. 255,384

19 Claims. (Cl. 74—259)

This invention relates to a device by means of which one shaft or rotary member is driven from another shaft or rotary member. It may be used in almost any association in which it is desirable to connect two shafts or rotary members together; but, particularly, in a case where the driven shaft or member sometimes requires a greater effort to overcome its resistance to being turned or rotated than the effort available in the driving member from a source of power.

In normal usage, this device, coupling or drive is used as a driving medium to connect a co-axial driving and driven shaft turning at the same rotational speed so long as the load on the driven member does not exceed the power available from the driving member; but when the load on the driven member exceeds the power available from the driving member, the parts comprising this drive unit are so arranged that a greater turning effort than is available from the driving member is applied to the driven member at a reduced rotational speed, and these parts are also arranged so that when the load on the driven member decreases to or does not exceed the effort available from the driving member, then, the rotational speed of the driven member will increase until it reaches the same rotational speed of the driving member connected to a source of power.

In that sense, it may be considered a shaft coupling but its purpose is not merely that of furnishing a coupling between two shafts although that is one of its uses.

In the particular form here shown, the two rotary members which are connected are, in fact, shafts, and they are co-axial. One object of the invention is to provide a connection or drive by means of which two rotary members may be connected to each other and so arranged that they may rotate at the same speed and torque, or may rotate at different speeds and different torques, and in which the two shafts or other rotary members which are connected by the drive are caused to rotate in the same direction irrespective of any variation of torque or speed which may occur between them.

Other objects will appear from time to time throughout the specification and the claims.

The invention is illustrated more or less diagrammatically in the accompanying drawings, wherein.

Like parts are designated by like characters throughout the specification and the drawings.

Figure 1:
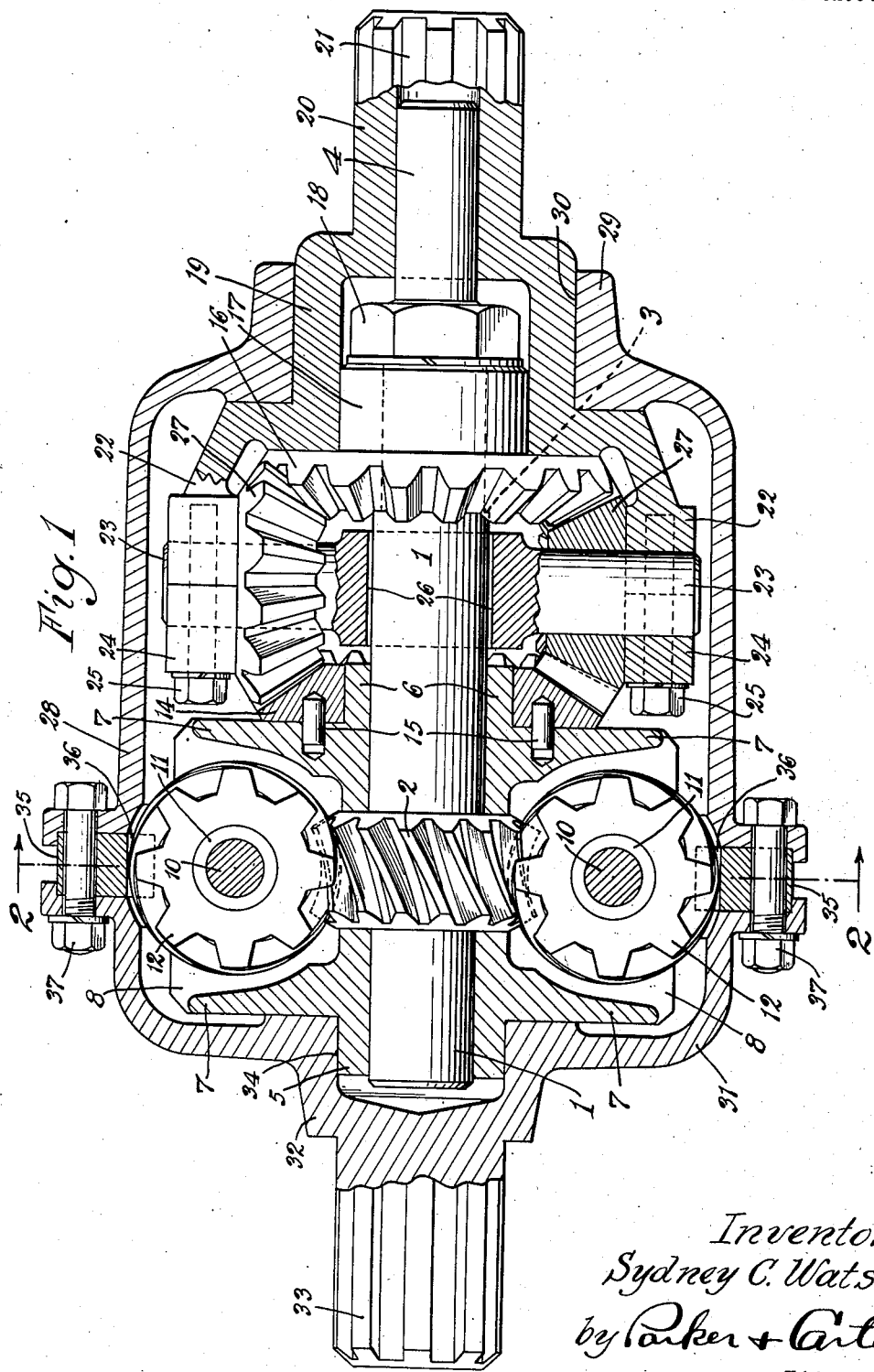
Figure 1 is a longitudinal section through the drive, with parts broken away and parts in elevation.
Figure 2:
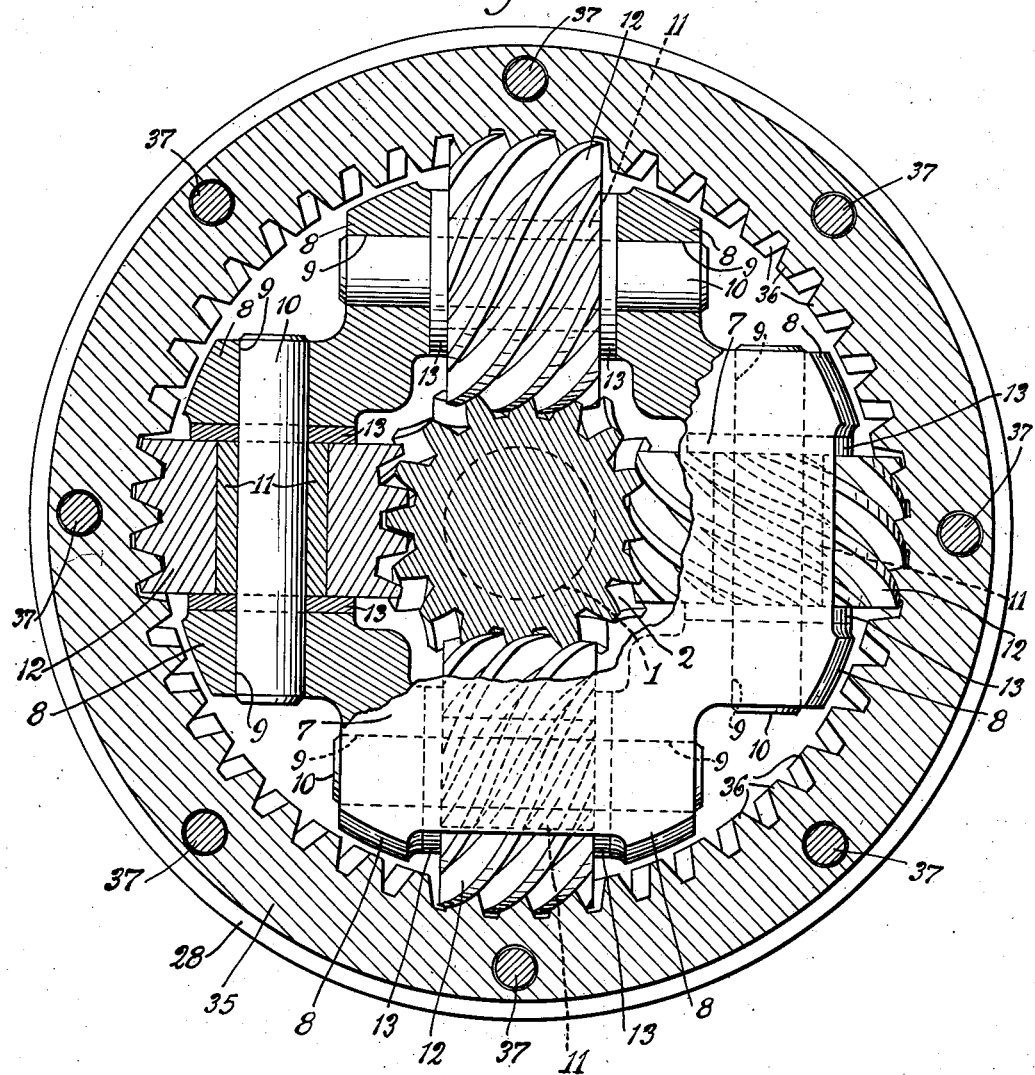
Figure 2 is a transverse section taken at line 2—2 of Figure 1, with some parts in section and with others broken away.

1 is an intermediate shaft which may be considered as a driving shaft, and it may be driven from any suitable source of power. Fixed to it or made integral with it is an external gear 2, having teeth cut on a helix or thread described about its own axis. A gear of this type is frequently called a worm gear. The shaft 1 may be shouldered as at 3 and may be further reduced as at 4.

Positioned freely upon the shaft 1 so that it may under certain circumstances rotate with respect to the shaft is a carrier or retainer, which in the particular form here shown comprises two sleeve-like portions 5, 6, positioned upon opposite sides of the gear 2, and bearing upon two sides or portions of the shaft 1. Extending radially from each of the sleeve-like portions 5, 6 are in the present form of the invention four web portions or sections 7. Each of these is joined by a pair of transverse webs 8; and each of the webs 8 is perforated as at 9 to receive a shaft 10.

Upon each of the shafts may be mounted bushings 11; and upon each of these is mounted a helical gear 12. Preferably, these gears, as shown particularly in Figure 1, have a plurality of threads. Since these gears are free to rotate on the shafts, they may be considered as idler gears or as idler worms. As shown, each of them meshes with the gear 2. Washers or anti-friction members 13 may be positioned about the shafts 10 and between each gear 12 and the adjacent surface of the corresponding section 8. It is to be understood that anti-friction bearings, such as ball or roller bearings, might be provided for the gears 12. They have been omitted merely to simplify the showing and their omission does not mean that their use is impossible.

Mounted upon the sleeve-like portion 6 is a beveled gear 14, which may be secured to the adjacent web portion 7 by pins 15. It may, of course, be secured to the sleeve-like portion 6 or the web 7 in any other manner so that it is fixed in relative motion with respect to these parts.

A second beveled gear 16 abuts against the shoulder 3 of the intermediate shaft; a member 17, which may or may not be integral with the gear 16, contacts it; and it and the gear are held in place upon and prevented from rotation with respect to the intermediate driving shaft 1 by means of a nut 18.

Positioned about the member 17 is a cup-like section 19. At its outer or free end it is reduced as at 20 to fit closely about the shaft portion 4. The portion 20 may be exteriorly splined as at 21, or otherwise shaped as desired. The cup-like member 19 has extending from it inwardly two or more bearing-carrying arms 22, 22. While these may be of almost any desired shape, as shown, each forms one half of a supporting bearing for a shaft 23. The other portion of the bearing is formed by a member 24, which is secured removably in place by screws 25. The shaft 23 is pierced as at 26 so that it may fit about the shaft 1. Mounted at or near each end of the shaft 23 is a beveled pinion 27. These pinions mesh with both of the beveled gears 14 and 16.

A housing or enclosing member 28 surrounds a portion of the mechanism described and is reduced at 29 and has a bearing at 30 upon the exterior of the cup-like portion 19. A second housing section 31 surrounds the remainder of the mechanism above described and is reduced as at 32 and carries a stub shaft section 33, which may be splined, as shown. The reduced portion 32 has a bearing as at 34 upon the outside of the sleeve-like portion 5.

Positioned between the housing sections 28 and 31 is an internal gear 35, which in the form here shown has teeth 36 cut in a helix described about its axis. The teeth 36 mesh with or are engaged by the worms or gears 12. The two housing sections 28 and 31, and the gear 35 are all secured together by bolts 37, and the parts are, thus, held in proper assembled position.

While it has been said that the intermediate driving shaft 1 may be driven from any suitable source of power, it is to be understood that the shaft 1 is not directly connected to the source of power. It is the splined member 20, 21 that is connected to the source of power and is rotated, and thus constitutes a driving shaft. Its rotation carries the member 22 and the beveled pinions 27 which since they mesh with the beveled gear 16 carry it either bodily with no rotation of the beveled pinions or, if the pinions are in rotation, they rotate about their axes and rotate bodily about the center axis of the complete assembly, thus moving the intermediate driving shaft 1 in either case. The member 20, 21, although it is shown as splined, may have any shape suitable for attachment or connection to a source of power.

The device as shown comprises in addition to its other parts an assembly or a sub-assembly which may be considered as a "differential." It includes substantially the parts generally understood to be covered by that term. The effect of the differential is to permit the turning effort or torque which is available in the driving member to be applied both to the center retainer or carrier which carries the worm gears 12 and to the external worm gear 2 fixed on the intermediate driving shaft 1. If it is assumed that the device is connected to a source of power and to a member to be driven and that the resistance to the turning in the driven member is too great to permit of a direct 1—1, the center retainer or carrier will either rotate at reduced speed or will stand still entirely. Under certain conditions, it may occur that the center retainer or carrier may reverse slightly. In any case, the differential mechanism will rotate the beveled gear 16, which is attached to the shaft 1 carrying the external worm gear 2 at an increased rotational speed and will, thus, effect a gear reduction between the external worm gear 2 and the internal worm gear 35.

At all times and under all conditions of operation, one-half of the initial turning effort is applied directly to the center retainer or carrier because the beveled gear 14 of the differential is secured to the carrier, thus providing for the carrier what is in effect a reaction member.

The turning effort just spoken of above, which is applied directly to the center retainer, is in addition to the axial thrust which is imparted to the idler worms 12 by the external worm gear 2 and it is the external worm gear which imparts rotation to the idler worms about their axes when that occurs.

Although I have shown an operative form of my device, it will be understood that many changes in the form, shape and arrangement of parts might be made without departing from the spirit of my invention, and I wish that my showing be taken as in a sense diagrammatic.

The use and operation of this invention are as follows:

In general, the device of the present invention is used as a drive or coupling or driving connection between two members, of which one is driven from some power source, and of which the other is driven through the device or drive shown herewith. A very common use will be for driving one shaft from another.

The external gear 2 on the intermediate driving shaft 1 drives the internal gear 35 by means of the idler gears 12; and from the gear 35, through the member 31, 32, the driven shaft 33 is driven. As stated, the idler gears 12, which furnish the connection between the gear 2 and the gear 35, are in mesh with the two gears constantly. While four such idlers are shown, almost any number might be used, and the invention is not limited to the particular number shown. For some installations, it is convenient to use four in order to achieve balance of the parts. The idlers are carried in the gear carrier or retainer, which includes the parts 5, 6, 7 and 8. By means of this carrier or retainer, they are supported and are held in proper alignment in the total assembly. Each gear is free to rotate upon its own axis under certain conditions, and the assembly, including the idler gears, the carrier which supports them and the beveled gear 14, may rotate with relation to the gear 2 or the gear 35.

As shown, the helix angle of the idler gears is such that they are reversible; that is, the helix angle is steep enough to permit the idlers to be rotated about their individual axes by the driving action of the external gear 2 under certain conditions.

In practice, when the device is in use and the driving shaft portion 20 is rotated from any suitable source of power, its rotation rotates the member 19, the arms 22, and under certain conditions the beveled gears 27 will not rotate about their axes. In that event, the gear assembly, which includes the beveled gears 14, 16 and the pinions 27, will rotate as a unit with the idler carrier 7, 8, carrying the idler gears 12. Under certain conditions, they will not rotate about their axes and, hence, carry the gear 35, the housing 31, 32 and the driven shaft 33; and, thus, the entire assembly rotates as a unit, and the shaft portion 21 and the shaft 33 rotate at the same speed and in the same direction. It will be seen that under these conditions of operation the transmission of driving force from the shaft 1 and the parts which rotate with it to the gear 35 is through the idlers 12 and by means of their axial thrust against the gear 35.

Under other conditions, the shaft 33 may rotate more slowly than the shaft part 20, and, in that case, relative movement of the gear 35 with respect to the gear 2 occurs and the idler gears 12 may then rotate about their respective axes.

I claim:

1. In combination in a coupling, a driving shaft, a gear fixed thereon, a driven shaft co-axial with said driving shaft, a gear connected thereto, and means interposed between said two gears for causing them to rotate in the same direction, said means including idler gears in mesh with both the driving and driven gears and positioned to move the driven gear by their axial thrust, and a differential comprising a plurality of gears, one of said gears fixed with relation to said driving shaft, the other of said gears mounted for bodily movement with said idler gears.

2. In combination, a shaft, an external worm gear thereon and fixed thereto, a co-axial carrier positioned upon said shaft for rotation with respect thereto, a plurality of idler gears supported in said carrier for rotation with respect thereto, an internal driven gear co-axial with respect to said shaft, positioned about said idler gears and in mesh with them, a shell secured to said internal driven gear, said shell being provided with bearings positioned co-axially with respect to said shaft, and a second or driven shaft secured to said shell and co-axial with said first mentioned shaft, and a differential comprising a plurality of gears, one of said gears fixed with relation to said driving shaft, another of said gears fixed to said carrier, and a pinion in said differential meshing with both of said gears.

3. In combination, a shaft, an external worm gear thereon and fixed thereto, a co-axial carrier positioned upon said shaft for rotation with respect thereto, a plurality of idler worm gears supported in said carrier for rotation with respect thereto, an internal driven gear co-axial with respect to said shaft, positioned about said idler gears and in mesh with them, a shell secured to said internal driven gear, said shell being provided wtih bearings positioned co-axially with respect to said shaft, and a second or driven shaft secured to said shell and co-axial with said first mentioned shaft, and a differential comprising a plurality of gears, one of said gears fixed in relation to said driving shaft, another of said gears fixed to said carrier, and a pinion in said differential meshing with both of said gears.

4. In combination, a shaft, an external worm gear thereon and fixed thereto, a co-axial carrier positioned upon said shaft for rotation with respect thereto, a plurality of idler gears supported in said carrier for rotation with respect thereto, the individual axes of said idler gears being positioned at an angle to and in a different plane from the axes of said driving gears, an internal driven gear co-axial with respect to said shaft, positioned about said idler gears and in mesh with them, a shell secured to said internal driven gear, said shell being provided with bearings positioned co-axially with respect to said shaft, and a second or driven shaft secured to said shell and co-axial with said first mentioned shaft, and a differential comprising a plurality of gears, one of said gears fixed in relation to said driving shaft, another of said gears fixed to said carrier, and a pinion in said differential meshing with both of said gears.

5. In combination, a shaft, an external worm gear thereon and fixed thereto, a co-axial carrier positioned upon said shaft for rotation with respect thereto, a plurality of idler gears supported in said carrier for rotation with respect thereto, an internal driven gear co-axial with respect to said shaft, positioned about said idler gears and in mesh with them, a shell secured to said internal driven gear, said shell being provided with bearings positioned co-axially with respect to said shaft and bearing upon said carrier, and a second or driven shaft secured to said shell and co-axial with said first mentioned shaft, and a differential comprising a plurality of gears, one of said gears fixed in relation to said driving shaft, another of said gears fixed to said carrier, and a pinion in said differential meshing with both of said gears.

6. In combination, a shaft, an external gear fixed on said shaft, an internal gear positioned thereabout and supported in movable relation to said shaft, means for driving the external gear, said means including a differential in part secured to said shaft, an additional means for driving the internal gear from the external gear, said additional means including a part of said differential.

7. In combination, an external gear, a shaft joined thereto, an internal gear positioned thereabout, means for driving the external gear, said means including a differential in part secured to said shaft, an additional means for driving the internal gear from the external gear, said additional means including a part of said differential, said means for driving said internal gear from said external gear including a plurality of helical gears positioned intermediate with internal and external gears and meshing with both of them.

8. In combination in a coupling, a driving shaft, a gear fixed thereon, an idler carrier positioned co-axially with said shaft and free to rotate with respect thereto, a plurality of idler gears mounted upon and for rotation with respect to said carrier, the axis of rotation of said idler gears differing from the axis of said shaft and said gear, and a driven gear in mesh with said idler gears, said driven gear being co-axial with said driving gear, a driven shaft co-axial with said driving shaft and said driven gear, and a connection between said driven gear and said driven shaft, and a differential including a plurality of gears, one being secured to said shaft, another to said carrier, and pinions meshing with both of said differential gears.

9. In combination in a coupling, a driving shaft, an external worm gear fixed thereon, an idler carrier positioned co-axially with said shaft and free to rotate with respect thereto, a plurality of idler gears mounted upon and for rotation with respect to said carrier, the axis of rotation of said idler gears differing from the axis of said shaft and said external gear, an internal driven gear in mesh with said idler, said internal driven gear being co-axial with said external driving gear, a driven shaft co-axial with said driving shaft and said driven gear, and a connection between said driven gear and said driven shaft, and a differential including a plurality of gears, one being secured to said shaft, another to said carrier, and pinions meshing with both of said differential gears.

10. In combination in a coupling, a driving shaft, an external worm gear fixed thereon, an idler carrier positioned co-axially with said shaft and free to rotate with respect thereto, a plurality of idler worm gears mounted upon and for rotation with respect to said carrier, the axis of rotation of said idler gears differing from the axis of said shaft and said external gear, an internal driven gear in mesh with said idler gears, said internal driven gear being co-axial with said external driving gear, a driven shaft co-axial with said driving shaft and said driven gear, and a connection between said driven gear and said driven shaft, and a differential including a plurality of gears, one being secured to said shaft, another to said carrier, and pinions meshing with both of said differential gears.

11. In combination in a drive, a shaft, an external gear fixed thereon, an idler carrier positioned on said shaft adjacent said gear and mounted for relative rotation with respect to said shaft, a plurality of idler gears mounted in said carrier for rotation about their respective axes, a shell portion positioned partly about said carrier, an internal gear fixed to said shell portion, said gear meshing with said idlers, a differential gear assembly positioned about said shaft, said assembly comprising two gears, one fixed to said carrier, the other fixed to said shaft; a pinion carrier, a plurality of pinions mounted for rotation with respect to said carrier and meshing with said differential gears, said carrier positioned for rotation about said shaft, and a second housing member positioned about said differential and secured to said internal gear.

12. In combination in a drive, a shaft, an external gear fixed thereon, an idler carrier positioned on said shaft adjacent said gear and mounted for relative rotation with respect to said shaft, a plurality of idler gears mounted in said carrier for rotation about their respective axes, a shell portion positioned partly about said carrier, an internal gear fixed to said shell portion, said gear meshing with said idlers, a differential gear assembly positioned about said shaft, said assembly comprising two gears, one fixed to said carrier, the other fixed to said shaft; a pinion carrier, a plurality of pinions mounted for rotation with respect to said carrier and meshing with said differential gears, said carrier positioned for rotation about said shaft, and a second housing member positioned about said differential and secured to said internal gear, said housing member bearing upon said differential pinion carrier.

13. In combination in a drive, a shaft, an external gear fixed thereon, an idler carrier positioned on said shaft adjacent said gear and mounted for relative rotation with respect to said shaft, a plurality of idler gears mounted in said carrier for rotation about their respective axes, a shell portion positioned partly about said carrier, an internal gear fixed to said shell portion, said gear meshing with said idlers, said shell carrying an outwardly extending shaft portion, a differential gear assembly positioned about said shaft, said assembly comprising two gears, one fixed to said carrier, the other fixed to said shaft; a pinion carrier, a plurality of pinions mounted for rotation with respect to said carrier and meshing with said differential gears, said carrier positioned for rotation about said shaft, said carrier terminating in a shaft portion, and a second housing member positioned about said differential and secured to said internal gear.

14. In combination in a drive, a shaft, an external gear fixed thereon, an idler carrier positioned on said shaft adjacent said gear and mounted for relative rotation with respect to said shaft, a plurality of idler gears mounted in said carrier for rotation about their respective axes, a shell portion positioned partly about said carrier, an internal gear fixed to said shell portion, said gear meshing with said idlers, said shell carrying an outwardly extending shaft portion, a differential gear assembly positioned about said shaft, said assembly comprising two gears, one fixed to said carrier, the other fixed to said shaft; a pinion carrier, a plurality of pinions mounted for rotation with respect to said carrier and meshing with said differential gears, said carrier positioned for rotation about said shaft, said carrier terminating in a shaft portion, and a second housing member positioned about said differential and secured to said internal gear, said housing member bearing upon said differential pinion carrier.

15. In combination in a drive, a shaft, an external worm gear fixed thereon, an idler carrier positioned on said shaft adjacent said gear and mounted for relative rotation with respect to said shaft, a plurality of idler gears mounted in said carrier for rotation about their respective axes, a shell portion positioned partly about said carrier, an internal worm gear fixed to said shell portion, said gear meshing with said idlers, a differential gear assembly positioned about said shaft, said assembly comprising two beveled gears, one fixed to said carrier, the other fixed to said shaft; a pinion carrier, a plurality of pinions mounted for rotation with respect to said carrier and meshing with said beveled gears, said carrier positioned for rotation about said shaft, and a second housing member positioned about said differential and secured to said internal gear.

16. In combination in a drive, a shaft, an external worm gear fixed thereon, an idler carrier positioned on said shaft adjacent said gear and mounted for relative rotation with respect to said shaft, a plurality of idler gears mounted in said carrier for rotation about their respective axes, a shell portion positioned partly about said carrier, an internal worm gear fixed to said shell portion, said gear meshing with said idlers, a differential gear assembly positioned about said shaft, said assembly comprising two beveled gears, one fixed to said carrier, the other fixed to said shaft; a pinion carrier, a plurality of pinions mounted for rotation with respect to said carrier and meshing with said beveled gears, said carrier positioned for rotation about said shaft, and a second housing member positioned about said differential and secured to said internal gear, said housing member bearing upon said differential pinion carrier.

17. In combination in a drive, a shaft, an external worm gear fixed thereon, an idler carrier positioned on said shaft adjacent said gear and mounted for relative rotation with respect to said shaft, a plurality of idler gears mounted in said carrier for rotation about their respective axes, a shell portion positioned partly about said carrier, an internal worm gear fixed to said shell portion, said gear meshing with said idlers, said shell carrying an outwardly extending shaft portion, a differential gear assembly positioned about said shaft, said assembly comprising two beveled gears, one fixed to said carrier, the other fixed to said shaft; a pinion carrier, a plurality of pinions mounted for rotation with respect to said carrier and meshing with said beveled gears, said carrier positioned for rotation about said shaft, said carrier terminating in a shaft portion, and a second housing member positioned about said differential and secured to said internal gear, said housing member bearing upon said differential pinion carrier.

18. In combination, a hollow housing, a driven shaft secured thereto, a driving shaft co-axial with said driven shaft extending from said housing and an intermediate shaft positioned within said housing between said driven and said driving shafts and co-axial therewith, and a train of gears connecting said intermediate shaft with said driven shaft and another being carried by said housing, and a differential gear assembly positioned within said housing and connected to said intermediate shaft, said differential including a first and a second gear, said first gear being secured to said intermediate shaft, said gear train including a carrier and a plurality of gears mounted thereon, said second differential gear being secured to said carrier.

19. In combination, a hollow housing, a driven shaft secured thereto, a driving shaft co-axial with said driven shaft extending from said housing and an intermediate shaft positioned within said housing between said driven and said driving shafts and co-axial therewith, and a train of gears connecting said intermediate shaft with said driven shaft, one of said gears being carried by said intermediate shaft and another being carried by said housing, and a differential gear assembly positioned within said housing and connected to said intermediate shaft, said differential including a first and a second driving member, said first driving member being secured to said intermediate shaft, said gear train including a carrier and a plurality of gears mounted thereon, said second differential driving member being secured to said carrier.

SYDNEY C. WATSON.